March 5, 1968 D. H. SHARP 3,371,636
WATERBORNE VESSELS
Filed July 12, 1965 5 Sheets-Sheet 2

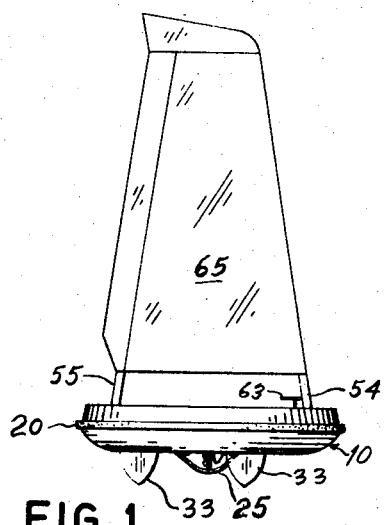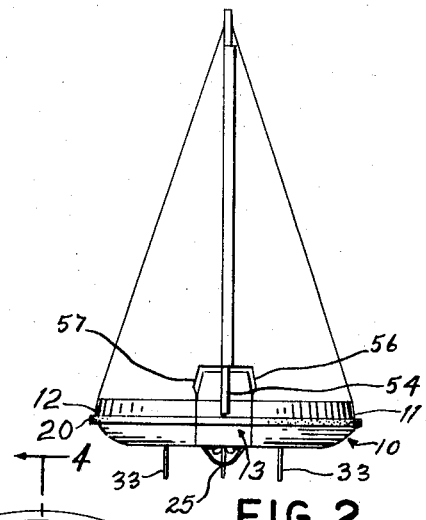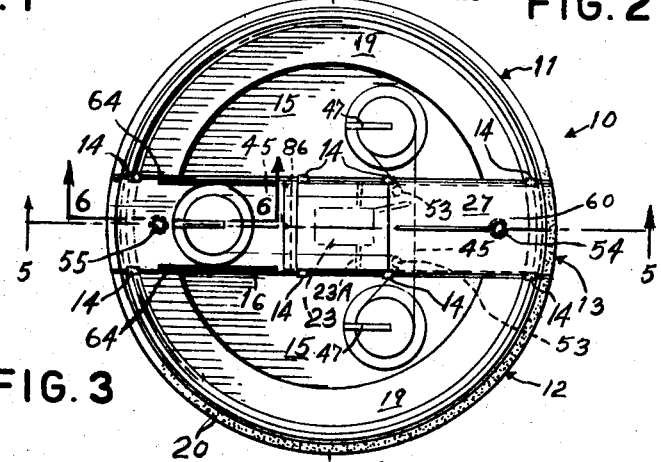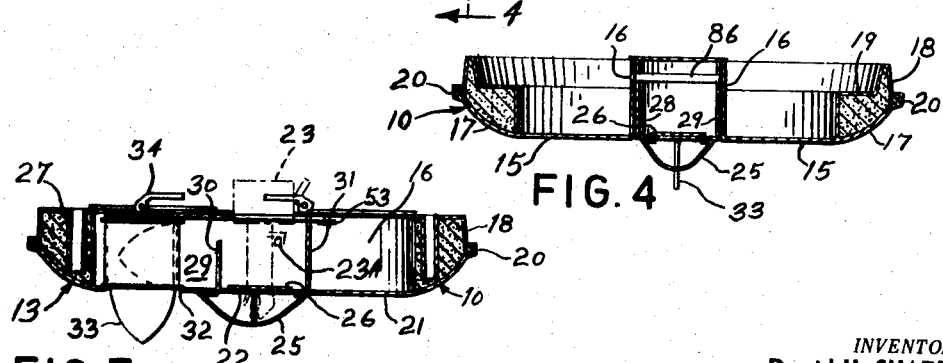
INVENTOR
David H. SHARP
ATTORNEY

INVENTOR
David H. SHARP

ATTORNEY

March 5, 1968 D. H. SHARP 3,371,636
WATERBORNE VESSELS

Filed July 12, 1965 5 Sheets-Sheet 3

INVENTOR
David H. SHARP
ATTORNEY

March 5, 1968  D. H. SHARP  3,371,636
WATERBORNE VESSELS
Filed July 12, 1965  5 Sheets-Sheet 4
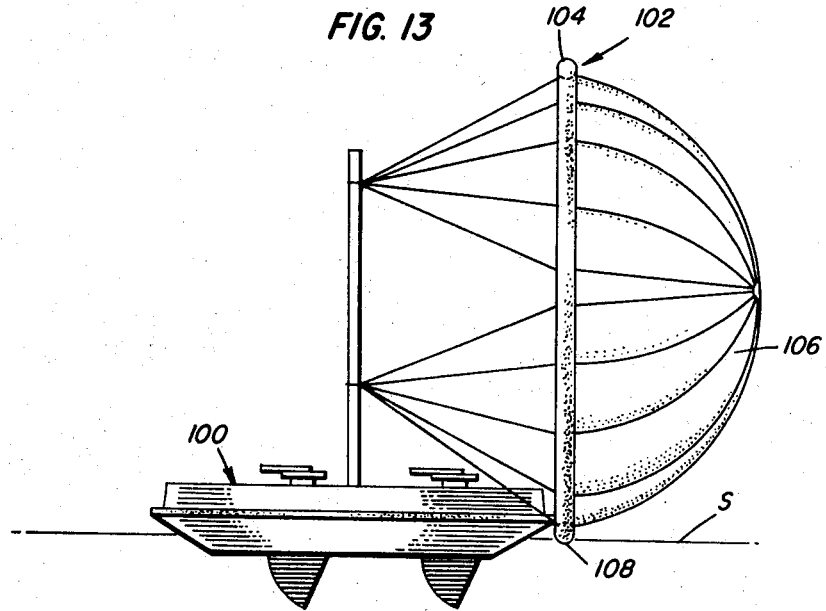
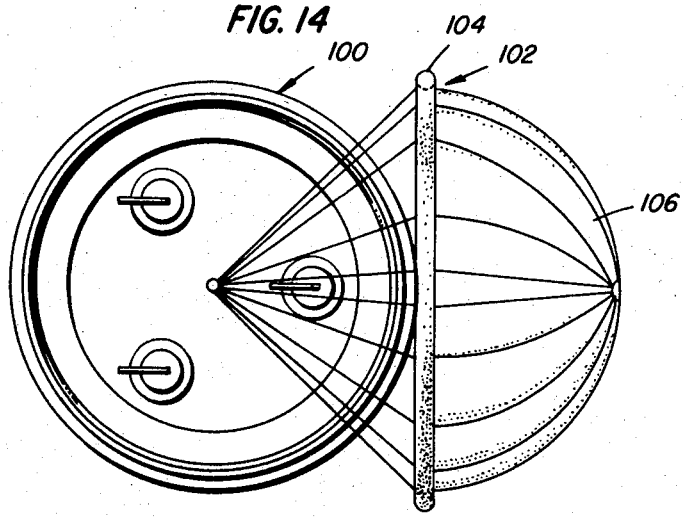
INVENTOR
DAVID H. SHARP
BY
ATTORNEY March 5, 1968     D. H. SHARP     3,371,636
WATERBORNE VESSELS
Filed July 12, 1965     5 Sheets-Sheet 5
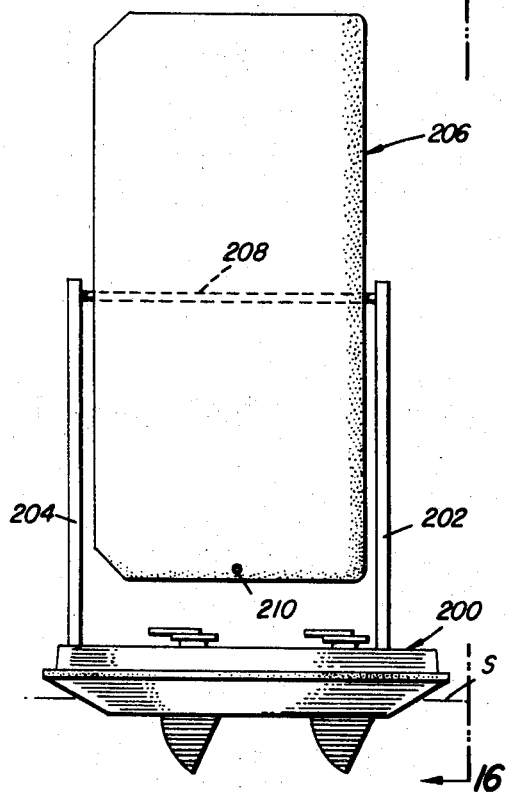
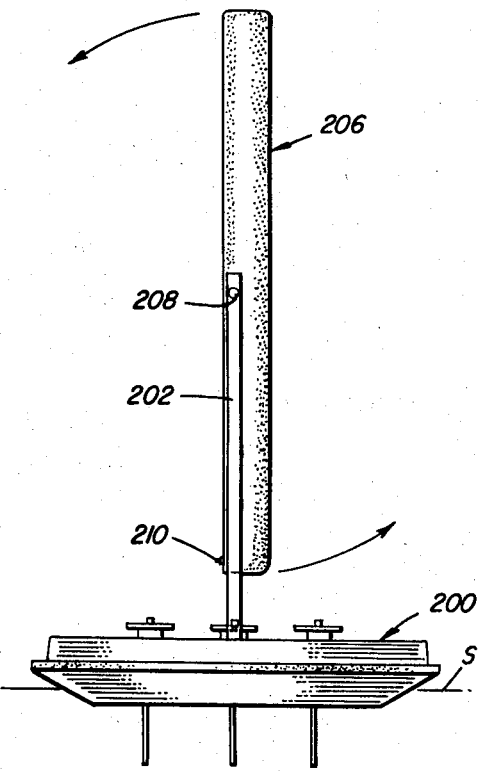
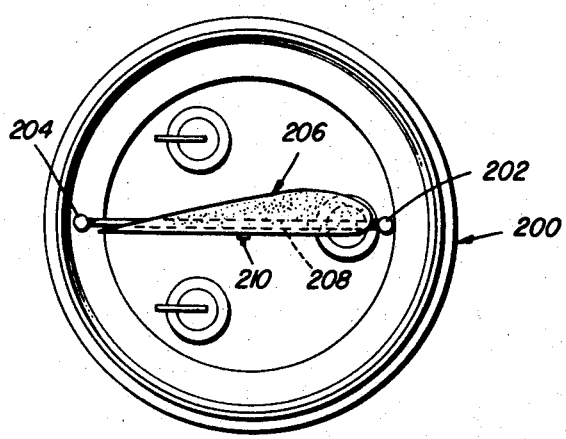
INVENTOR
DAVID H. SHARP United States Patent Office 3,371,636
Patented Mar. 5, 1968

3,371,636
WATERBORNE VESSELS
David H. Sharp, 6 Linnet Crescent,
Strathmore, Quebec, Canada
Filed July 12, 1965, Ser. No. 471,117
28 Claims. (Cl. 114—39)

ABSTRACT OF THE DISCLOSURE

A circularly hulled vessel in which triangularly arranged control-board means depend beneath the hull and substantially surround the center of the hull, and in which the control-board means can be simultaneously or independently operated during various conditions, and in which the vessel can be power or sail operated.

During recent years the number of people indulging in sailing as a pastime has vastly increased. A wide range of sailing craft are offered to the would-be participant in this sport and the vast majority of these craft have the conventional elongated hull with a distinct bow and stern and relatively narrow width amidships. It is well known that the amateur sailor can capsize a craft of this type with relative ease. For example, a sudden shift in wind which takes him by surprise could capsize such a vessel.

A fairly recent development has been the introduction of a vessel the hull of which is completely circular in plan and which has the form of a minor segment of a sphere. Practical embodiments of this vessel have a diameter of between about 6 ft. to 12 ft. This vessel can be constructed fairly cheaply and has very considerable advantages as regards portability over land and stability on the water. Obviously, being completely symmetrical, its stability in all directions is substantially the same and can be compared to the fore and aft stability of a dinghy of conventional hull construction. However, the vessel does have shortcomings insofar as its controls are concerned. This stems from the fact that it has a conventional rudder and tiller arrangement and a single center board or keel extending along a diameter of the hull.

Thus the main object of the present invention is to improve vessels of the type having substantially circular hulls by providing a completely new system of controls for such vessels. The vessel may be motor or sail powered.

A secondary object of the invention is to provide a new sail which, in conjunction with the novel controls, produces a craft of unequaled versatility.

The above objects will be explained in more detail and other objects of the invention will become apparent as the following description proceeds.

In the drawings:

FIGURE 1 is a side view of a vessel in accordance with the present invention,

FIGURE 2 is a front view of the vessel of FIGURE 1,

Figure 6:
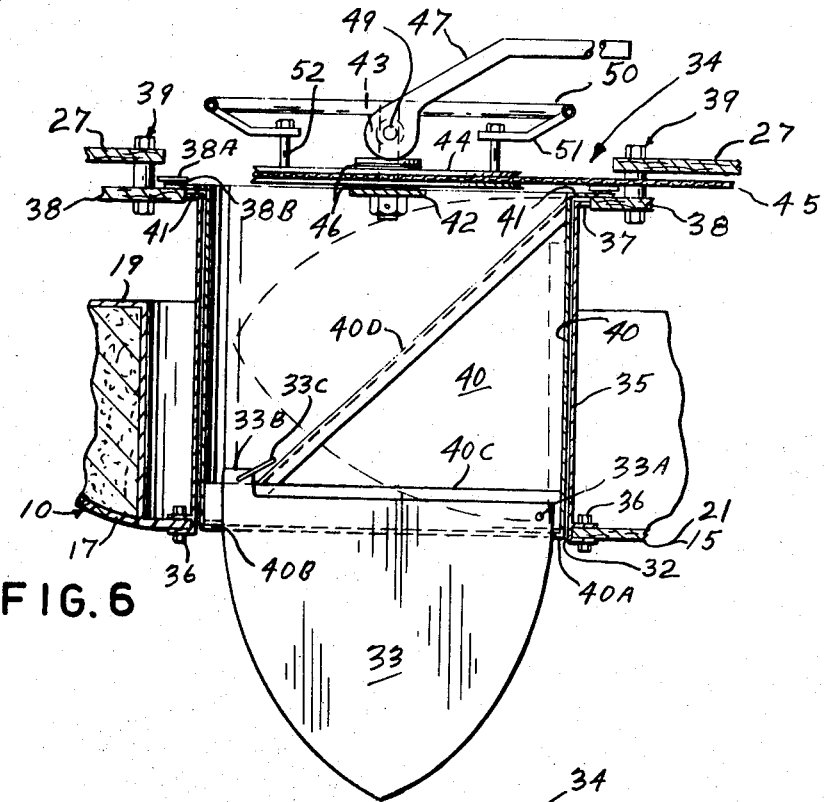
Figure 7:
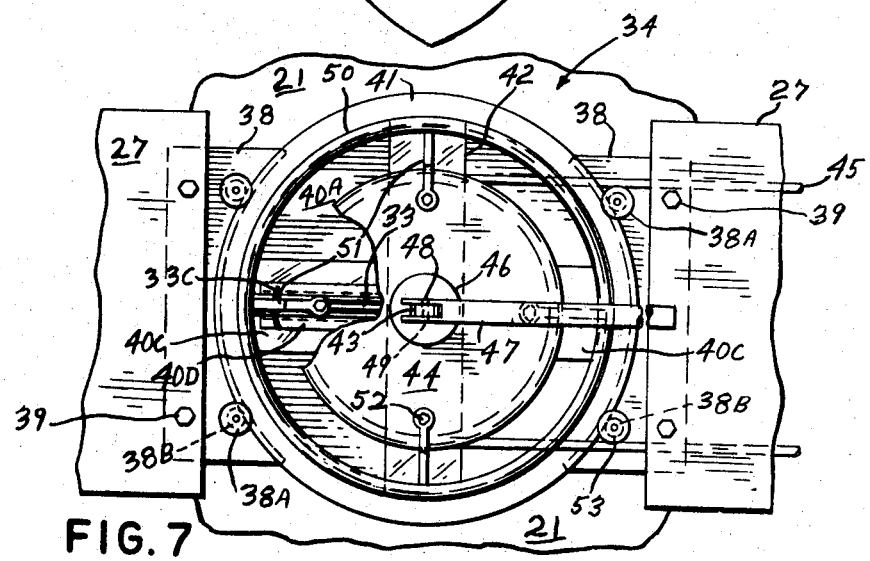
Figure 8:
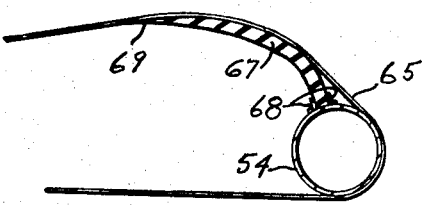
Figure 9:
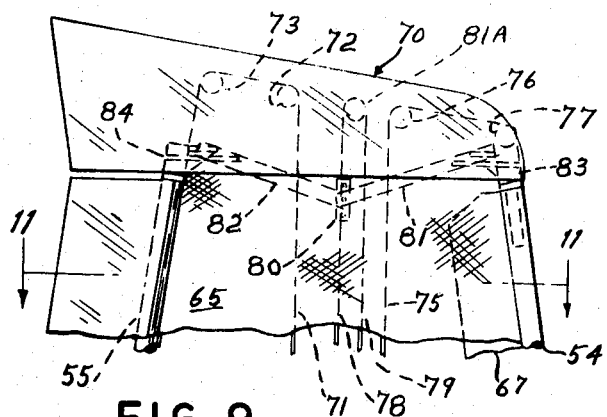
Figure 10:
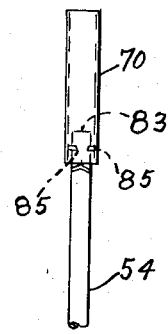
Figure 11:
Figure 12:
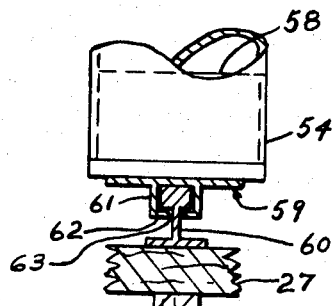

FIGURE 3 is a plan view of the vessel of FIGURES 1 and 2 with the sail omitted to show the deck construction, FIGURE 4 is a section on the line 4—4 of FIGURE 3, FIGURE 5 is a section on the line 5—5 of FIGURE 3, FIGURE 6 is a vertical cross-section, to a greatly enlarged scale, through the operating means of one of the control surfaces of the vessel, FIGURE 7 is a plan view of the operating means of FIGURE 6, FIGURE 8 is a horizontal cross-section, to a larger scale than FIGURES 1 to 5, through the foremast of the vessel and also shows the part of the sail adjacent to the foremast, FIGURE 9 is a side elevation illustrating the structure provided at the top of the masts of the vessel for reefing and sail trimming purposes, FIGURE 10 is a front view of the structure of the structure illustrated in FIGURE 9, FIGURE 11 is a diagrammatic plan view of the sail and illustrates a flap provided at the rear of the sail, and FIGURE 12 is a vertical cross-section illustrating structure provided for mounting the masts on the hull and for permitting relative movement therebetween, FIG. 13 is a side elevational view illustrating a spinnaker type sail having a floatable rim, FIG. 14 is a top plan view of FIG. 13, FIG. 15 is a side elevational view of a pivotable sail, FIG. 16 is an end elevation of FIG. 15 looking from line 16—16 of FIG. 15; and FIG. 17 is a top plan view of FIG. 15.

The vessel illustrated broadly includes a hull which, in plan, is of substantially circular configuration, at least three vertical boards constituting directional control means projecting below said hull, and means for changing the orientation, in vertical planes, of the control boards with respect to the hull thereby to permit directional control of the vessel.

The hull 10 consists of port and starboard sections 11 and 12 and a center section 13. For ease of transportation on a trailer the sections 11 and 12 are each secured to the section 13 by means of hinges 14.

The port and starboard sections each consist of a bottom skin or shell 15 which is in the shape of a segment of a circle and which is integral with a straight, vertical, inner wall 16 and an arcuate outer or side wall 17. The upper part of the side wall 17 constitutes a gunwale 18 and also includes a horizontal, part-annular surface 19 which constitutes a seat. A fender 20 in the form of a square (or round) cross-section strip of soft rubber extends around the outer periphery of the sections 11 and 12. The hull is preferably constructed from aluminum sheeting of suitable thickness and the wall 17 is of hollow construction which is partially or wholly foam filled to provide buoyancy.

The center section 13 is, as will be seen from FIGURE 5, very similar in cross-section to the sections 11 and 12. Thus, this section has sidewalls 17, gunwales 18, and fenders 20 and cooperates with the sections 11 and 12 to produce the substantially circular gunwale and fender of the vessel. The section 13 also includes two surfaces which form parts of the completely circular seat 19. However, these surfaces cannot be used in view of the position occupied by the sail, and merely serve for strengthening purposes.

The center section 13 has a bottom skin or shell 21 with two apertures therein. The first one, referenced 22 in FIGURE 5, serves to permit a motor 23 (of the "outboard" type and shown in phantom) to project through the bottom of the vessel. A diaphragm (not illustrated) which can be of rubber surrounds the motor at the part thereof which projects through the aperture 22 and serves to seal the gap between the skin 21 and the motor 23. The motor can be mounted in any convenient manner, for example, it can be supported by a cross bar 24 of the center section 13. A guard 25 is provided for preventing the propellor of the motor from striking any obstructions in the water beneath the vessel.

It will be understood that the motor 23 is an optional feature for, as will be described hereinafter, the vessel is primarily intended to be propelled by means of a sail which will be described. In the event that the motor is removed and the vessel used as a sail boat a suitable diaphragm 26 is provided for completely sealing the aperture in the bottom of the vessel. Alternatively, if the vessel is intended to be an "economy" model, then it is possible for the aperture 22 to be completely omitted. In this case the vessel has no specific adaptation for enabling a motor to be fitted but it is possible, without undue difficulty, to suspend an outboard motor over the side of the vessel at any location. This can be effected by clamping the motor to the gunwale 18 in exactly the same manner as an outboard motor would be clamped to the sternboard of a conventional dinghy or other boat.

As described, the center section has a skin 21 and in addition has decking 27, and two sidewalls 28 and 29. It will be seen from FIGURE 4 that the sidewalls 16 of the sections 11 and 12 lie juxtaposed to the walls 28 and 29.

In addition to the walls 28 and 29 the center section 13 also has two transverse walls 30 and 31 which, with the parts of the walls 28 and 29 therebetween, define a "box" structure for receiving the outboard motor 23.

In the forward part of each of the sections 11 and 12, and in the rearward part of the center section 13, there is an aperture adapted to receive the directional control arrangements of the vessel. In the drawings only the aperture in the center section 13 is illustrated in detail this being seen in FIGURES 5, 6 and 7. This aperture is referenced 32 and the control board or surface associated therewith is referenced 33. The further description of this arrangement will be continued with reference to FIGURES 6 and 7, it being understood that the corresponding arrangements provided in the forward parts of the sections 11 and 12 are of identical construction.

Referring now to FIGURES 6 and 7 it will be seen that the control mechanism, generally indicated at 34 and associated with control element 33, is mounted immediately above the aperture 32 in the skin 15. The control arrangement 34 includes an outer drum 35 which is bolted, as at 36, to the shell 15. The upper end of the drum 35 is formed with an outwardly directed rim 37 which is a fairly easy push fit between two cross members 38. The cross members 38, which are supported below the decking 27 by bolt and spacers assemblies 39, each has an arcuate edge which faces the drum 35 and cooperates with the rim 37.

An inner drum 40 is provided within the drum 35 and has an outwardly directed rim 41 at the upper end thereof. By means of lubricant between the rims 37 and 41, or the provision of a suitable roller bearing between these rims, the drum 40 is made to be freely rotatable in the drum 35. Spindles 38A mounted on the cross members 38 carry loose bushings 38B which serve to take up lateral thrust on the drum 40. Rollers or wheels (not shown) mounted on vertical spindles can, if desired, be mounted at the lower end of the drum 40 to take up the thrust imposed on the drum 40 by the water. The rollers would run on the inside of the drum 35 and would be at a level other than that of the ribs 40C. According to a slightly modified construction, the rim 37 may be of larger diameter and the cross members 38 omitted. The assemblies 39 in this constructional form support the rim 37 and the spindles 38A are mounted on the rim 37.

A transverse member 42 extends across the drum 40 and is suitably secured thereof, for example, by welding. A shaft or axle 43 passes through the member 42 and is keyed to the member 42. The axle 43 also passes through a pulley 44, around which an endless cable, belt, or band 45 is entrained, there being friction discs 46 immediately above and below the pulley 44, if desired. Above the upper friction disc 46 is mounted a tiller 47, the tiller 47 having a forked end 48 (see FIGURE 7). The axle 43 lies between the arms of the forked end 48 and a pin 49 passed through aligned holes in the forked end 48 and the axle 43 secures these elements to one another.

A ring 50 having four inwardly directed arms 51 is mounted on the pulley 44. The radially inward ends of the arms 51 serve to receive bolts 52 which pass through the arms 51 and into tapped holes in the pulley 44.

The drum 40 has a bottom wall 40A which has a slot 40B extending diametrically thereacross. A pair of flanges 40C extend upwardly along the edges of the slot 40B and the board 33 is pivotally secured, by means of a pin 33A, passing through the flanges 40C to the drum 40. A short lug 33B projects from the upper edge of the board 33 and a clevis pin 33C is passed through a hole in the lug 33B. The pin 33C cooperates with the top edges of the flanges 40C to limit downward pivoting movement of the board 33. The pin 33C, cooperating with a latch (not illustrated) serves to hold the board 33 in a raised position (shown in phantom). A cross brace consisting of two angle irons 40D spaced apart to allow the board 33 to pass therebetween, extends diagonally across the drum 40.

The cable 45 passes around the pulley 44 of each of the control mechanisms 34 and the path of this cable can be seen from FIGURE 3. Two smaller pulleys 53 are mounted beneath the decking 27 and the cable is also entrained around these so that its path is almost entirely beneath the decking 27. This greatly lessens the risk of a passenger tripping over the cable.

As described above, the vessel is, in one constructional form, equipped to receive an outboard motor or, if not equipped to receive the outboard motor, can readily be provided with one in a conventional manner. The primary mode of propulsion of the vessel is, however, intended to be sail power and to this end the sail construction shown in FIGURES 1 and 2 (and illustrated in more detail in FIGURES 8 to 12) is provided. The vessel includes a foremast 54 and an aftmast 55 which is forked at the lower end and includes two arms 56 and 57 of relatively short vertical height. This is best seen in FIGURE 2. The lower part of the mast 54, and the lower ends of the arms 56 and 57, are secured to the deck of the vessel by means of the arrangement illustrated in FIGURE 12. This arrangement will be described as applied to the foremast 54. The lower end of the foremast 54 has a plug 58 entered therein with a bracket 59 secured to the bottom surface of the plug 58. The decking 27 of the center section 13 has a rail 60 bolted thereto, the rail 60 being in the form of an I-beam, the upper flange of which is of substantially square (or "railroad rail") cross-section. The bracket 59 has depending walls 61 and inwardly directed, lower lips 62, there being a gap 66 between the lower lips. Thus the bracket 59 serves to receive the upper flange of the rail 60 whereby sliding motion of the mast 54 along the rail 60 is permitted. The plug 58 also permits rotation of the mast 54 about its vertical axis. As will be seen from FIGURE 3, two rails 64 are provided at the aft part of the vessel to receive the two arms 56 and 57 of the aft mast 55.

The sail illustrated is an "aerodynamic" sail and a canvas sheet 65 constituting the sail has its two vertical free edges mounted on the aft mast 55 by means of two standard slide connections (see FIGURE 11). More specifically, the edges of the sail are bound to two vertically extending ropes which, by means of a halyard described hereinafter, can be drawn upwardly along vertical slots of the mast 55. Thus the sail, effectively, is endless and has a hollow interior. To produce the requisite aerofoil shape the foremast 54 is rotatable about its vertical axes. To this end, a lever 66 (FIGURE 1) is mounted at the lower end of the mast and cooperates with a suitable locking mechanism as will be described. A sail deflector 67 (FIGURE 8) is rigidly mounted on the mast 54 and extends over the greater portion of the height of the mast. This sail deflector 67 is of rubber, or material having substantially the same properties as rubber, and has a cross-section which tapers from a thick edge, which is mounted on the mast by being entered between two vertical, projecting brackets 68 to a thin or trailing edge 69. The top of the deflector 67 is shown in FIGURE 9 and its bottom edge is substantially flush with the bottom of the sail 65.

The structure illustrated in FIGURE 8 permits the aerofoil section of the sail to be varied depending on the wind direction and the direction in which it is desired to sail. The position illustrated is for a starboard tack and to reach the port position the mast 54 is rotated through an angle of approximately 140°. This has the effect of bringing the deflector 67 into contact with the other side of the sail so that the sail is "bulged" outwardly by virtue of the pressure exerted thereon by the deflector 67. The tapering configuration of the deflector 67 is necessary to provide a smooth contour for the sail. The deflector 67 can be locked in each of its operative positions by means of any suitable locking mechanism. For example, the locking device could include a plate secured to the bracket 59 and having two pin receiving depressions therein. In this form the lever 68 carried by the mast includes a spring loaded pin adapted to seat in one or other of the depressions.

The deflector 67 can be replaced by a vertical roller mounted on the mast 54 and within the sail. The roller is spaced a short distance from the mast so that, upon rotation of the mast, the roller travels through an arc and into contact with one or other side of the sail.

In FIGURES 9 and 10 the structure provided for permitting raising and lowering of the sail and which also permits reefing of the sail is illustrated. The masts 54 and 55 carry a cap 70 into which the upper ends of the masts 54 and 55 project. The cap 70 can be of thin gauge aluminum sheeting. An aft halyard 71 extends upwardly within the sail 65 and over small pulleys 72 and 73 mounted within the cap 70, and thence downwardly to its juncture with the top aft part of the sail 65. A forward halyard 75 extends upwardly within the sail, over small pulleys 76 and 77 and thence downwardly to join the upper forward edge of the sail 65.

Two reefing halyards 78 and 79 are also illustrated. The halyard 78 extends upwardly within the sail 65 and is made fast to a block 80. The halyard 79 also extends upwardly within the sail 65 and passes over a pulley 81 and thence downwardly and is made fast to the block 80. The block 80 is carried on two swivel arms 81 and 82. The other ends of these arms 81 and 82 are pivotally secured to projecting brackets of cylindrical plugs 83 and 84. The plugs are of short axial length and are entered into the upper ends of the masts 54 and 55. Keys 85 project from each side of the cap 70 (best seen in FIGURE 10) and slide in grooves in the plugs 83 and 84.

As will be explained hereinafter it is necessary, for reefing purposes, to move the lower ends of the masts 54 and 55 towards one another and for other purposes it is necessary to draw the masts apart. For this purpose a very simple winch is provided. This winch includes a pipe 86 (FIGURE 3) having its ends fitted, fairly loosely, in holes in the side walls 28 and 29 of the center section 13. Further holes are provided in the side walls 16 (see FIGURE 4) to permit accesss to be had to the pipe 86. If desired, rotation of the bar 86 can be assisted by inserting brass bearing sleeves into the holes in the walls 28 and 29. The pipe 86 has a cross pin 87 at each end thereof and two cables (not shown) each have one end wrapped around the pipe 86 and the other ends thereof secured to the masts 54 and 55. A cranking handle having a forked end is employed to rotate the pipe 86 to draw the lower ends of the masts toward one another. This winch is also required when the sail is being raised as the masts have to be drawn together into parallel relationship. Rotation of the pipe 86 in one direction draws the masts together and rotation in the other direction draws them apart.

A vertically elongated flap 87 (FIGURES 1 and 11) is secured to the aftmast 55. This flap is preferably of aluminum sheet (20 gauge is suitable) and is welded or blind riveted at 88 to the mast 55.

The above described vessel can be sailed, with a given wind direction, in any direction covering about a 330° arc. That is to say, it is only incapable of sailing into the wind and within about 15° on either side of the wind direction.

Considering FIGS. 13 and 14, to even further increase the versatility of the craft 100, a sail 102 of the spinnaker type can be provided. Preferably this sail is of a plastic material and includes an inflatable rim 104, of substantially circular configuration, and a slack sheet 106 extending across the aperture defined by the rim. This form of spinnaker sail has the advantage that it is capable of floating and hence does not have to be supported by the boat. In its operative condition, the lower part 108 of the rim of this sail is in contact with the water surface S and, while acting as a sail, is in fact floating.

The forked end 48 of each tiller 47 is in the form of a cam which acts upon the upper disc 46 when in the illustrated position. The tiller 47 can be swung in a vertical arc about the pin 49 to a further position diametrically opposed to the illustrated position. In this position the forked end 48 of the tiller is spaced from the disc 46 and the pulley 44 and wheel 50 are thus free to rotate on the pin 43. Thus in the illustrated position the tiller 47 and wheel 50 are effectively a single unit, and in the other position only the tiller 47 is fast with the board 33. With the tiller in the illustrated position it is possible, by turning one of the tillers 47 or one of the rings or wheels 50 to change the orientation of all three boards 33, and consequently the direction of motion of the vessel can be made to change without, however, changing its attitude to the wind. In addition by rotating only one of the boards 33, i.e. by placing the tiller 47 in its other position, and then turning the same while holding the associated wheel, the craft can be turned in the conventional manner. Various other manoeuvres can also be performed. A wedge or any other simple device can be provided for holding the wheel 50 while the tiller 47 is being used for steering.

The sail is intended to be raised by hand using the halyards 71 and 75. To reef the sail the halyard 78 is pulled downwardly whereby the block 80 and the ends of the arms 81 and 82 are drawn downwardly. This causes, in effect, a scissors movement of the arms 81 and 82 which draws the upper ends of the masts 54 and 55 towards one another. The winch described above is used to draw the lower ends of the masts together. The tension applied to the sail by the masts is thus released and the sail slides downwardly. The top of the sail can be trimmed by pulling on the halyard 79.

The described vessel is also capable of being provided with a different type of reefing means. More specifically, a form of "roller" reefer can be provided. To this end the foremast is made hollow and a vertically elongated roller is mounted within the mast. The mast has a vertical slit therein. The free vertical edges of the sail are both entered in this slit and secured to the roller. Thus by rotating the roller the sail can be wound into the annular space between the roller and the mast. In this constructional form, the sail, being composed of a single sheet, is passed around the aft mast in exactly the same manner as the sail described above passes about the foremast. During reefing the masts are moved towards one another.

As described above, the vessel is constituted by three mutually hinged sections. This is a necessary arrangement in that otherwise the craft could not be towed on the highway without infringing the regulations relating to maximum vehicle width. For vessels having a diameter not exceeding the maximum legal width the expense of providing the hinging arrangement can be avoided. A substantially simpler and less expensive hull having an outer skin consisting essentially of a one-piece aluminum saucer can then be employed.

It is also possible, within the scope of the present invention to build a craft of the "houseboat" type. Such a craft would have steering mechanism of the kind described above but would, obviously, be larger in size and be differently equipped bearing in mind its intended purpose. The diameter of such a craft would be 20 to 30 feet and it would obviously not be towable on the highway. A substantial advantage of this craft is its ability to sail with its cabin in any desired attitude to the wind and sun direction. Thus, use of the lee of the cabin can always be had for purposes of shelter regardless of the wind direction.

Although applicant's invention has been described in relation to a craft having three boards 33, it is also possible, within the scope of the invention, to employ four or more boards. If four boards are employed, these are arranged as at the corners of a quadrilateral (square or rectangle).

Considering FIGS. 15–17, a simpler form of sail can be provided while retaining all the advantages of an "aerodynamic" sail. To this end, the vessel 200 is provided with fore and aft masts 202 and 204, respectively, having approximately half the height of the sail 206. The upper end of each of these masts is adapted to receive a horizontal beam 208 which extends from one mast to the other and supports the sail 206.

The sail 206 is of air impermeable rubber or plastic material and is preformed to "aerodynamic" shape as seen in FIG. 17. That is to say, in plan, the sail has the configuration of an aerofoil section.

The sail is mounted on said beam 208 which passes through the sail with suitable sealing (not shown) at locations where the beam passes through the side walls of the sail.

To enable the sail to be stored in a relatively small space and at the same time to permit it to be inflated, a valve 210, which can be of the "bicycle" valve type, is provided.

By rotating the sail 206, see direction arrows of FIG. 16, about the horizontal axis constituted by the beam 208, the two tack positions of the sail are attained.

The action of the deflector 67, namely, the production of an "aerofoil" sail can also be obtained with a mast of substantially oval cross-section which can rotate through an angle similar to that of the mast 54. The sail is entrained about one of the smaller radii of curvatures of the mast and one of the two larger radii of curvatures of the mast is thrust against the inside surface of the sail.

The spinnaker sail described is attached by guys to the vessel at, or only a short distance above, deck level.

It is necessary to secure the three sections 11, 12 and 13 to one another while the sections are in the condition illustrated in the drawings, and to this end bolts (not shown) are provided. For example, these bolts can be provided between the walls 16 and the adjacent walls 28 and 29. More specifically, "eye" screws having ring-shaped heads can be secured to the walls 16, 28 and 29 with the apertures in the heads aligned. The bolts, of inverted L shape, are merely passed downwardly through one eye screw attached to the centre section and through another eye screw attached to an outer section. The bolt is then turned so that its horizontal part is entered beneath one of the seats or beneath the decking. Six sets of eye screws and bolts can be provided.

For the purposes of stability, the spinnaker sail may have one or more holes in the flat sheet which extends across the aperture defined by the rim. The hole or holes provided have the same effect as the corresponding hole in a parachute and permits a steady flow of air to pass through the sail.

I claim:
1. A vessel comprising a single, substantially circular hull having a forward-aft axis intersected generally at the center of the hull by another axis at right angles thereto; and three, directional-control-and-stabilizing means on said hull and generally surrounding said hull center, said last-mentioned means comprising control-board means depending beneath said hull, means journaling said control board means on a substantially vertical axis of rotation, and means for rotating said control-board means about their respective axis of rotation, one axis of rotation being disposed substantially on the hull forward-aft axis rearwardly of the hull center, and the other two axes of rotation being disposed laterally of said other hull axis, forwardly of said hull center.

2. The structure as claimed in claim 1 in which said hull comprises a central section and two lateral, crescent-shaped sections combining to form said substantially circular hull, and means displaceably connecting said hull sections together for facilitating transport of the hull over land.

3. The structure as claimed in claim 1 in which said hull includes means for mounting a power unit on said hull.

4. The structure as claimed in claim 1 including means connected to the respective directional-control-and-stabilizing means for affording integrated rotation of said control-board means.

5. A vessel including a hull which is substantially circular, three vertical boards projecting below said hull and constituting directional control means, said boards being distributed in a triangular arrangement, means rotatably supporting said boards, and means interconnecting the supporting means thereby to permit simultaneous rotation of all of said boards, each supporting means including a rotatable inner drum to which the related board is secured, and an outer drum fixedly secured to the hull.

6. The structure as claimed in claim 1 in which said control-board means includes means for elevating the control-board means above the undersurface of said hull.

7. The structure as claimed in claim 1 in which said means for rotating said control-board means includes means for optionally permitting simultaneous and/or independent rotation of said control-board means.

8. The structure as claimed in claim 7 in which said control-board means include pulley elements generally normal to said axes of rotation, said means for rotating said control-board means comprising an endless force-transmitting element entrained about said pulley elements.

9. The structure as claimed in claim 8 in which each of said pulley elements includes an integral wheel disposed above the pulley element and concentric to the axis of rotation thereof.

10. The structure as claimed in claim 8 in which each of said pulley elements includes a tiller element projecting radially from the axis of rotation of the respective pulley element.

12. The structure as claimed in claim 11 in which said of said control-board means comprises relatively-rotatable, inner and outer drums, said outer drums being secured to said hull, and a control board secured to said inner drum and having a portion positionable below the lower surface of said hull.

12. The structure as claimde in claim 11 in which said control board is displaceably mounted on said inner drum, and means for raising and lowering said control boards within said inner drums.

13. A vessel including a hull of substantially circular configuration, three vertical boards constituting directional control means projecting below said hull, said boards being distributed in a triangular arrangement, and means for changing the orientation in vertical planes of the boards with respect to the hull to permit directional control of the vessel, said hull including sail means comprising a pair of spaced apart masts, and a preformed, inflated sail of aerofoil cross-section supported by said masts, and means approximately midway of the height of the sail mounting said sail on said masts for rotation about a horizontal axis.

14. A vessel according to claim 5 in which each board is pivotally mounted at one point on the related inner drum.

15. A spinnaker sail for a waterborne vessel, comprising an inflated rim, said sail including a slack sheet closing the sail and peripherally surrounded by said rim.

16. A sail structure for a waterborne vessel, comprising a pair of spaced apart masts, and a preformed, inflated sail of aerofoil cross-section supported by said masts and means approximately midway of the height of the sail mounting said sail on said masts for rotation about a horizontal axis.

17. A sail structure for a waterborne vessel comprising a pair of spaced apart masts, a sail composed of an effectively endless sheet of material, the material being wrapped around a part of the circumference of at least one of said masts, and means within the sail for bulging one side of the sail outwardly to cause the sail to adapt an areofoil shape, said means being rotatable about a vertical axis coinciding with the axis of one of the masts.

18. A sail structure for a waterborne vessel comprising a pair of spaced apart masts, a sail composed of an effectively endless sheet of material, the material being wrapped around a part of the circumference of at least one of said masts, and means within the sail for bulging one side of the sail outwardly to cause the sail to adapt an aerofoil shape, said means consisting of a tapered rubber deflector having a vertical thick edge attached to one mast and a vertical thin edge.

19. The vessel of claim 1, including sail means mounted on said hull.

20. The vessel of claim 2, including sail means mounted on said hull.

21. The vessel of claim 3, including sail means mounted on said hull.

22. The vessel of claim 4, including sail means mounted on said hull.

23. The vessel of claim 5, including sail means mounted on said hull.

24. The vessel of claim 1 including sail means comprising an inflated rim and sheet material across an aperture encompassed by said rim.

25. A vessel including a hull of substantially circular configuration, three vertical boards constituting directional control means projecting below said hull, said boards being distributed in a triangular arrangement, and means for changing the orientation in vertical planes of the boards with respect to the hull to permit directional control of the vessel, including sail means comprising a pair of spaced apart masts, and a preformed, inflated sail of aerofoil cross-section supported by said masts.

26. A vessel including a hull of substantially circular configuration, three vertical boards constituting directional control means projecting below said hull, said boards being distributed in a triangular arrangement, and means for changing the orientation in vertical planes of the boards with respect to the hull to permit directional control of the vessel, including sail means comprising a pair of spaced apart masts, a sail composed of an effectively endless sheet of material, the material being wrapped around a part of the circumference of at least one of said masts, and means within the sail for bulging one side of the sail outwardly to cause the sail to adapt an aerofoil shape.

27. The vessel of claim 26 in which, said means is rotatable about a vertical axis coinciding with the axis of one of the masts.

28. The vessel of claim 26, in which said means consists of a tapered rubber deflector having a vertical thick edge attached to one mast and a vertical thin edge.

References Cited

UNITED STATES PATENTS

| 433,955 | 8/1890 | McPartland | 114—128 X |
| 779,440 | 1/1905 | Pool | 114—135 X |
| 831,636 | 9/1906 | Suhm et al. | 114—39 |

FOREIGN PATENTS

| 1,344,428 | 10/1963 | France. |
| 318,762 | 2/1920 | Germany. |
| 445,639 | 6/1927 | Germany. |
| 463,701 | 8/1928 | Germany. |

MILTON BUCHLER, *Primary Examiner.*

T. M. BLIX, *Assistant Examiner.*